USOO5617692A

United States Patent [19]
Johnson et al.

[11] Patent Number: 5,617,692
[45] Date of Patent: Apr. 8, 1997

[54] COMPOSITE STRUCTURE

[75] Inventors: David W. Johnson, San Diego County; W. Brandt Goldsworthy; George Korzeniowski, both of Los Angeles County, all of Calif.

[73] Assignee: Ebert Composites Corporation, San Diego, Calif.

[21] Appl. No.: 196,650

[22] Filed: Feb. 14, 1994

Related U.S. Application Data

[63] Continuation-in-part of Ser. No. 828,499, Jan. 31, 1992, Pat. No. 5,285,613, and a continuation-in-part of Ser. No. 7,079, Jan. 21, 1993, Pat. No. 5,319,901, and a continuation-in-part of PCT/US93/00888 Feb. 1, 1993.

[51] Int. Cl.$^6$ ............................................. E04H 12/02
[52] U.S. Cl. ........................ 52/651.02; 52/651.09; 52/655.1; 52/648.1; 403/255; 403/171; 403/231; 256/22
[58] Field of Search ....................... 52/651.01, 651.02, 52/651.03, 651.07, 651.09, 655.1, 656.9, 282.1, 282.2, 282.3, 283, 649.2, 648.1; 403/205, 255, 171, 173, 263, 231, 219; 256/22, 65, 73

[56] References Cited

U.S. PATENT DOCUMENTS

| | | | |
|---|---|---|---|
| 1,057,216 | 3/1913 | Bovard et al. | 52/651.02 |
| 3,149,704 | 9/1964 | Hodapp | 403/219 X |
| 3,231,054 | 1/1966 | Gartrell | 52/283 X |
| 3,486,287 | 12/1969 | Guillon | 52/288.2 X |
| 3,973,756 | 8/1976 | Lauzier | 256/22 X |
| 3,984,962 | 10/1976 | Krhon | 52/649.2 |
| 4,073,477 | 2/1978 | Walters | 256/22 |
| 4,250,679 | 2/1981 | Burg | 52/655.1 X |
| 4,556,337 | 12/1985 | Marshall | 403/255 |
| 4,803,819 | 2/1989 | Kelsey | 52/309.1 |
| 4,974,987 | 12/1990 | Smock | 403/255 X |

Primary Examiner—Carl D. Friedman
Assistant Examiner—Winnie Yip

[57] ABSTRACT

A structure derives its structural strength and integrity entirely from interlocked pultruded composite members. The disclosed techniques can be used in a wide variety of applications including replacement for steel frame structures and is especially useful where the electrical properties of steel are undesirable, such as in high voltage transmission towers. Two types of pultrusions are used as structural members to build the entire structure. Lock-in butt joints between all members are made by inserting the compressed ends of the resilient bifurcations of the crossmembers into openings in the receiving member, where they expand to lock in place and are blocked against subsequent compression by inserts. Channels spanning the entire column lengths permit insertion of a crossmember anywhere along the channel where there is an access opening. Cruciform crossmember supports used throughout are made by passing one member through an expandible slit in the other member until corresponding notches interlock, with the joints so created allowing a few degrees of scissoring between the members to facilitate engagement of the crossmembers in the column channels through the smallest window possible.

19 Claims, 5 Drawing Sheets

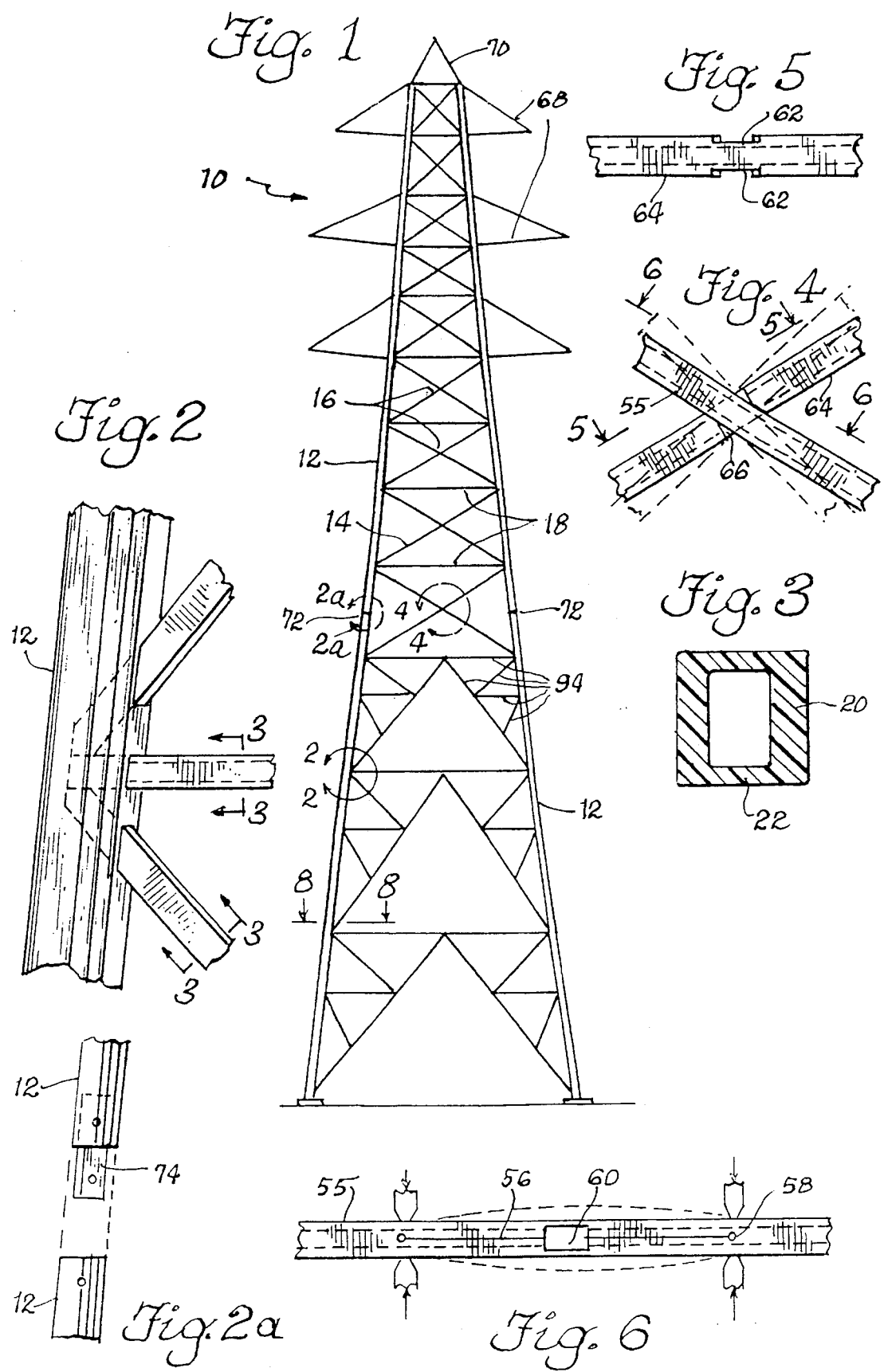

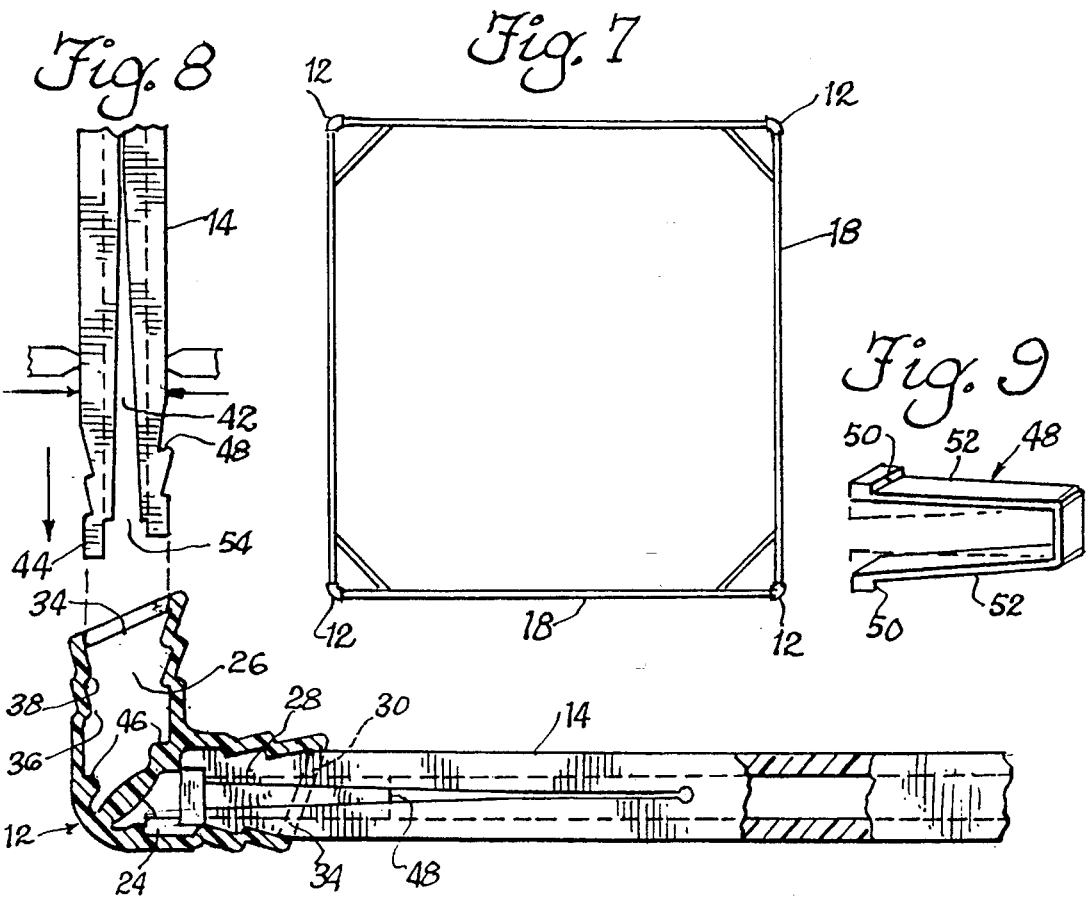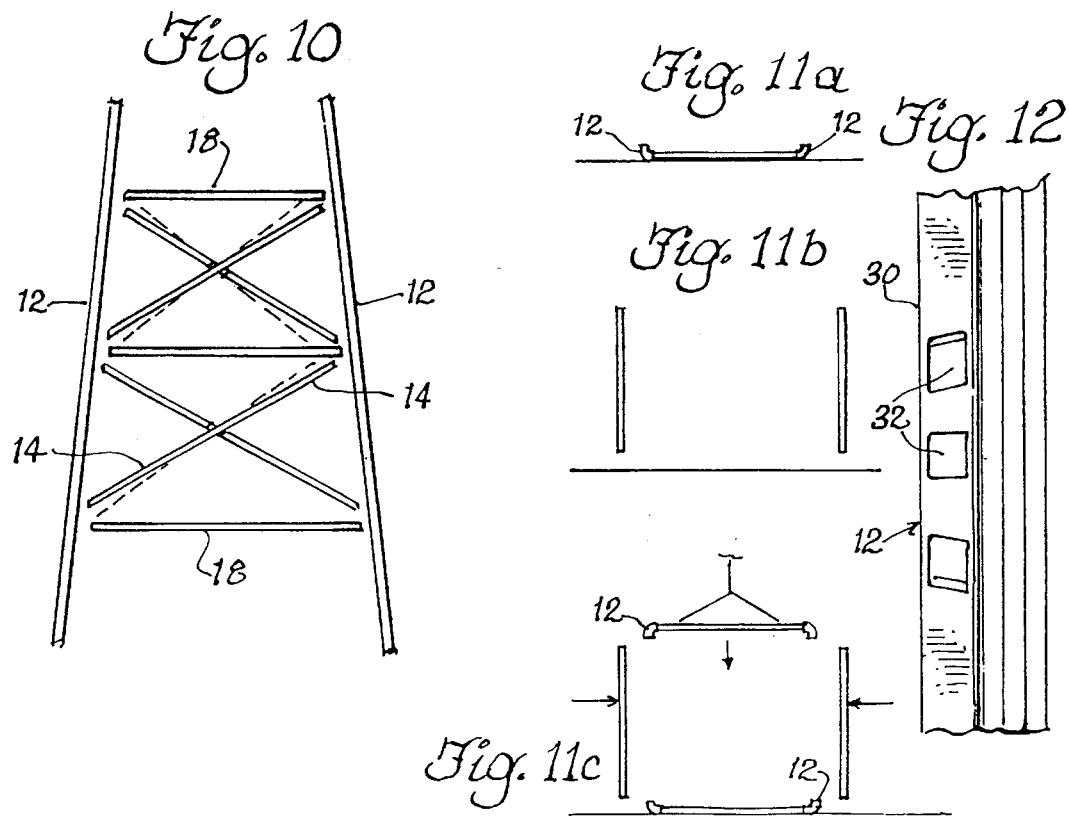

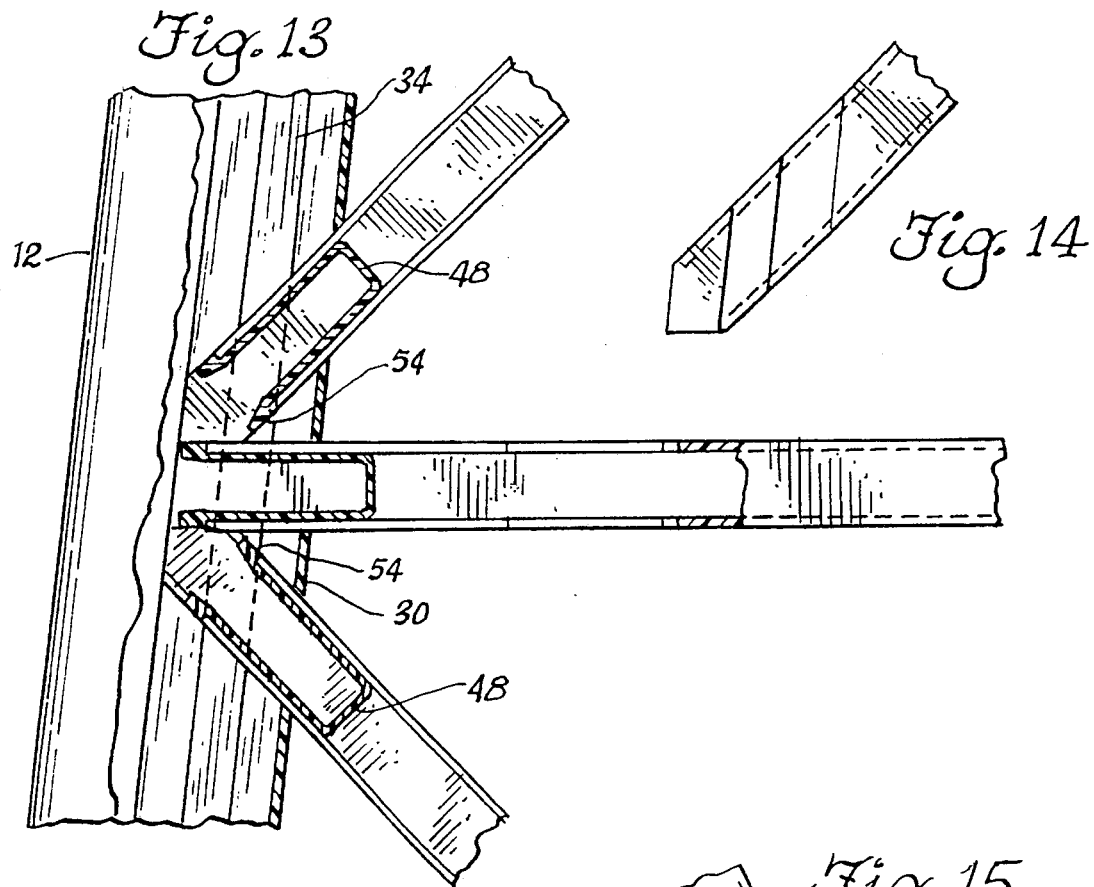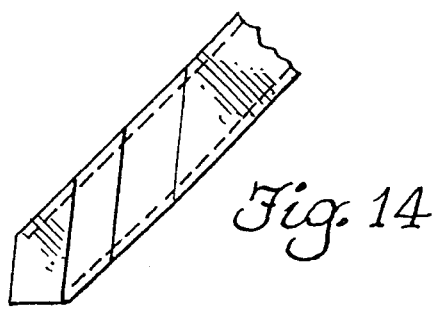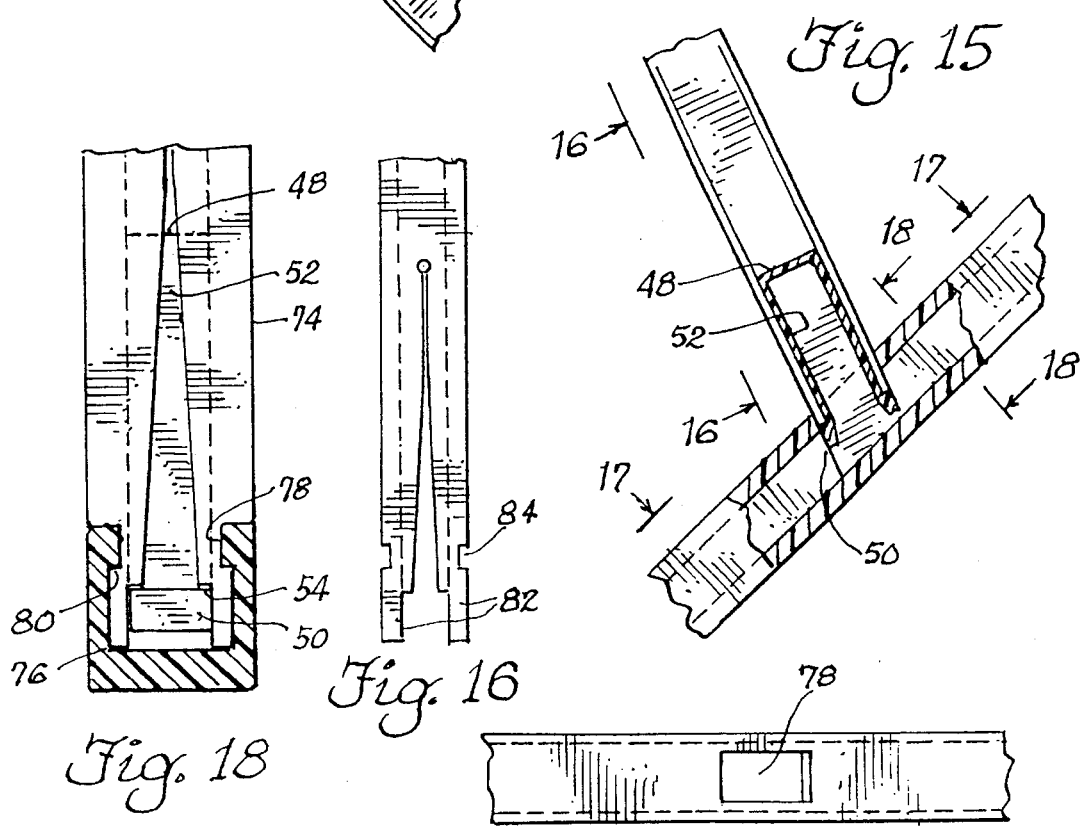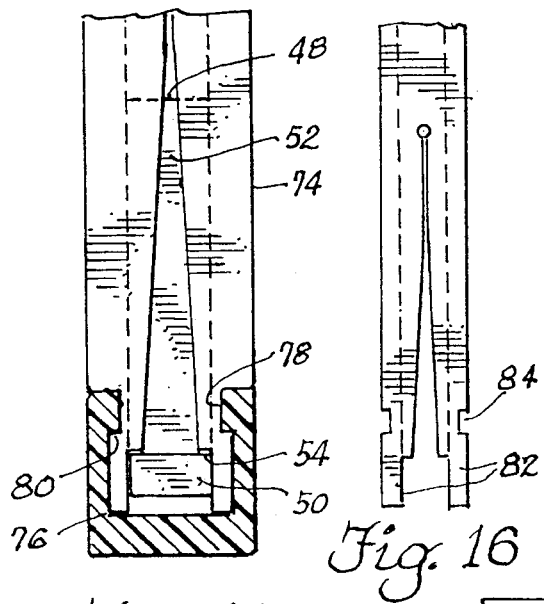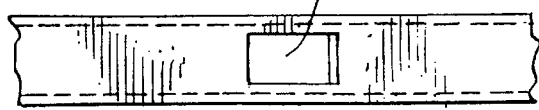

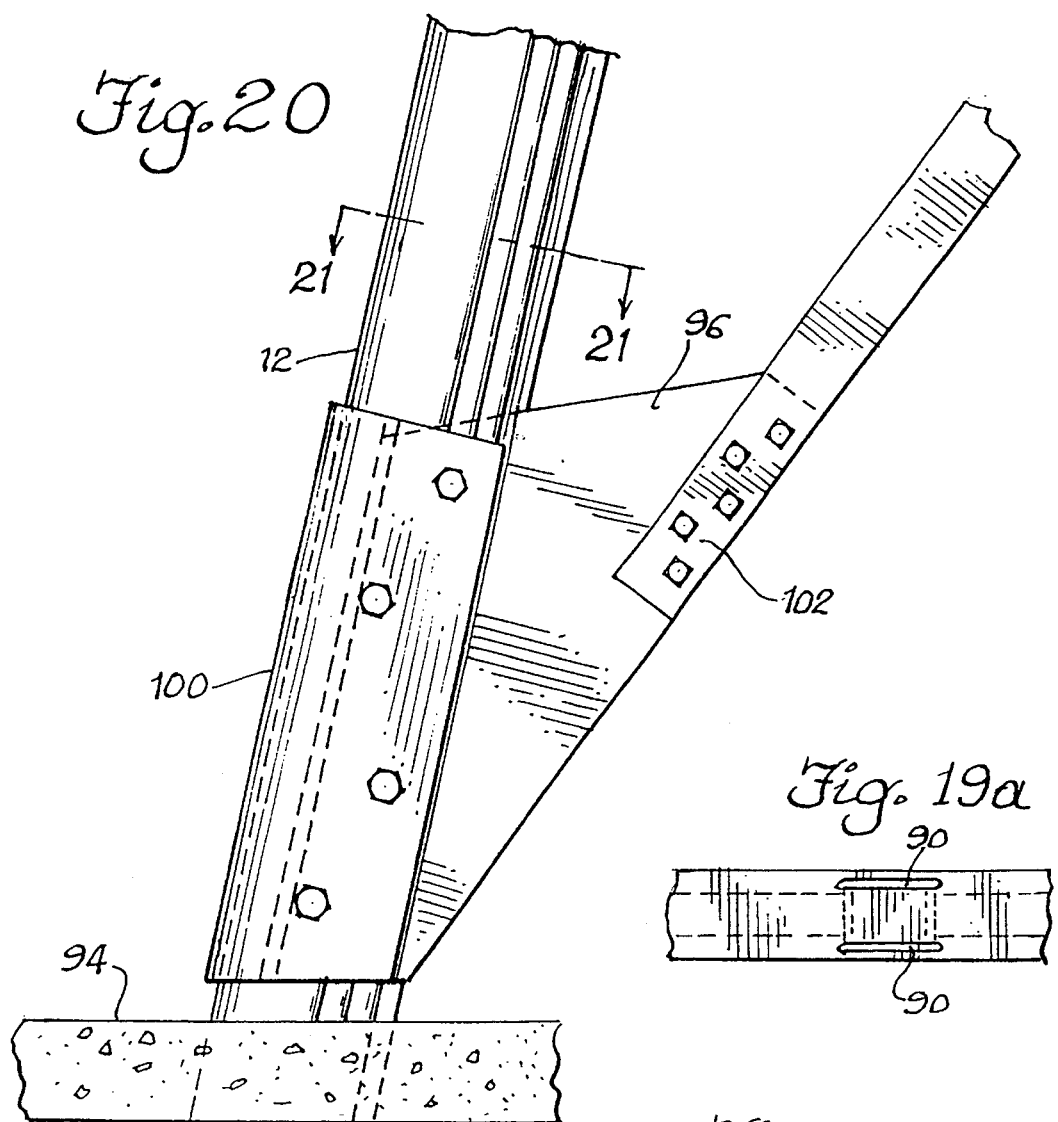
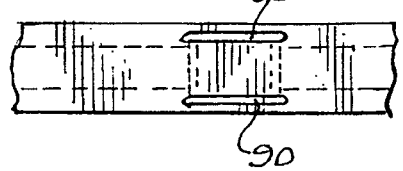
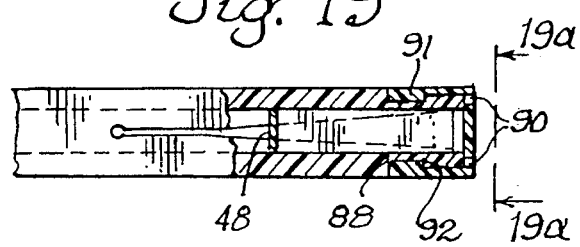
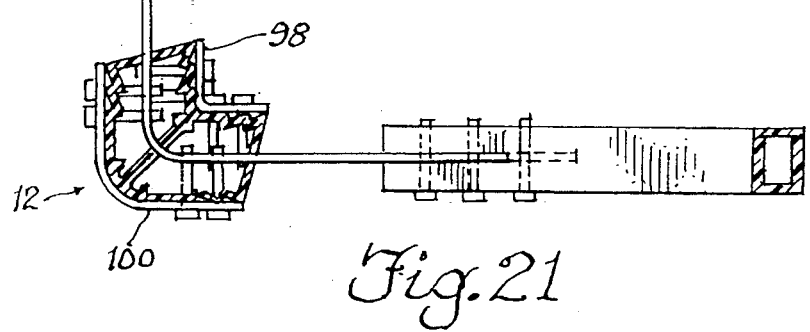

COMPOSITE STRUCTURE

BACKGROUND OF THE INVENTION

This application is a continuation in part of the following applications:

1. Ser. No. 828,499, filed Jan. 31, 1992, now U.S. Pat. No. 5,285,613, issuing Feb. 15, 1994, on a PULTRUDED JOINT SYSTEM AND TOWER MADE THEREWITH;
2. U.S. patent application Ser. No. 08/007079, filed Jan. 21, 1993, now U.S. Pat. No. 5,319,901, on a BIFURCATED COLUMN JOINT SYSTEM FOR ELECTRICAL TRANSMISSION TOWER; and,
3. International Application No. PCT/US93/00888, filed Feb. 1, 1993, titled PULTRUDED COMPOSITE JOINT SYSTEM FOR ELECTRICAL TRANSMISSION TOWERS AND OTHER LARGE STRUCTURES.

This series of inventions is in the field of composite construction and specifically uses two structural member types which are pultruded composites of different cross section configurations. Both the fibers and the resin of a composite are offered in a wide variety of different types which offer a range of physical characteristics such as resistance to heat, density, electrical insullative vqlye and dielectric strength, resistance to corrosion, strength, resilience, and so forth, so that members having almost any desired characteristics can be produced, provided one is willing to trade off other characteristics. The construction of this disclosure uses glass fibers in several forms in a basic polymer resin matrix. The reader is referred to the three cited parent applications, which contain detailed backgrounds which will only be summarized here.

The use of composites in heavy construction have been impeded largely by the difficulty in joining one composite structural member to another. Bolt holes seriously weaken the member by severing the fibers, which require continuity, enabling all of the fibers to act in unison. By tackling the joint problem, pultruded composite structural members are being used by applicants to replace steel structures, and in particular to replace high voltage transmission towers. The characteristics of the tower produced in this fashion are superior to steel in many respects, enabling the tower to be made lower to the ground (shorter) and narrower, with reduced EMF radiation and reduced risk of injury from shock to line workers.

The disclosures of the first two applications concern a four-cornered tower, the corners of which are columns with two mutually orthogonal, longitudinally extended channels which span the lengths of the columns for receiving the butted ends of crossmembers, which lock in place in the channels. This configuration has been used from the outset of the tower design project, and has been continuously improved to its present form, which is the final form of the full-sized prototype scheduled to be shipped for testing within a week of this writing. The joint configurations have been perfected and implemented in the prototype. The top half of the tower has been assembled and the components of the lower half have been made and will be shipped in pieces and assembled on-site.

SUMMARY OF THE INVENTION

The concepts described in the above-referenced disclosures are carried forth and perfected in the prototype as described in this disclosure. The corner columns are pultruded with a continuous exterior skin which covers the entryways to the two channels which seat the crossmembers. This skin is precisely cut to define windows at the crossmember entry locations, taking into account the angle of the crossmember as it enters the column. Because the columns are arched from bottom to top, and because they converge, at each level the angles of entry of the crossmembers are different. Since the corner columns are arched in the plane of the diagonal, the windows vary in angular orientation as well as in trapezoidal shape and size due to the compound angle nature of the incremental variations of insertion direction, leading to a series of windows in the skin which vary incrementally in shape and size from bottom to top.

The tower is designed to the last brace before the pultrusions are cut. A CAD program is used to precisely define the location and configuration of each window in the column, and the windows are cut by a CNC machine controlled by a CAM program.

The result is a set of columns which have precisely shaped and positioned pre-cut windows into the interior channels, and each crossmembers are likewise terminated to seat at the particular compound angle at which it enters the channels. To enable the windows and crossmembers to mate together as flushly as possible the cruciform or crossed bracing configuration which is repeated over the height of the tower comprises two crossed braces, one of which passes through the center of the other, which are locked together but permitted to "scissor" in the plane they define by the mating notches with which they interlock one another. When each of the four sides of the structure is being assembled, the crossed members are laid out between the two columns, which are spaced apart form the crossmembers, and the columns are moved together engaging the compressed ends of the crossmembers in the appropriate windows and then drawn up tight into the final assembly with the crossmembers fully seated. This movement causes the crossmembers to scissor a few degrees, which is permitted by the design of the joint.

The support for the columns is largely provided by the cruciform crossmembers which are two-inch by two-inch hollow beams each having one pair of parallel side walls which is thicker than the other pair. Each crossmember end is bifurcated to define resilient bifurcations which may be compressed together for entry into the window or into an opening cut into another crossmember. The exterior surfaces of the ends of the bifurcations lockingly engage the corresponding surfaces of the interior of the members in which they butt, and the bifurcations are locked in place by means of a spring clip which is slid into the hollow crossmember far enough into the hollow interior to enable the bifurcations to compress for insertion. After the bifurcations have seated the clip is slid along inside the member to the joint where it locks in place, blocking the bifurcations against compression to define an inseparable rigid joint connection.

The resilience and flexibility of the glass fiber composites that are used in the disclosed tower are taken advantage of in the cruciform configuration of the crossmembers. The first crossmember of the pair has a longitudinal slit through its center with a central, internal notch. The crossmember expands alongside the slit to permit entry of a second crossmember which is provided with exterior notches cooperating with the internal notches of the first crossmember, such that the notches lock into place when aligned to define a scissoring joint.

The tower of the disclosure is made in a top stage and a bottom stage. The two stages are spliced together with insert mandrels. The bottoms of the columns of the lower tower half mount to the same steel angles extending from the underlying concrete slab that are used to mount steel towers, coupled with brackets which adapt the steel angle to the bottom ends of the columns.

BRIEF DESCRIPTION OF THE DRAWINGS

FIG. 1 is a elevation view of the construction of the invention in the form of a high voltage transmission tower;

FIG. 2 is an isometric view showing the entry of the typical crossmember ends into the channel of a column;

FIG. 2a illustrates the splice between two crossmember lengths;

FIG. 3 is a section taken along line 3—3 of FIG. 2 illustrating the cross section of the crossmember pultrusion;

FIG. 4 is a somewhat diagrammatic fragmentary view highlighting the the cruciform crossmember configuration and illustrating the scissoring capability;

FIG. 5 is a view along line 5—5 of FIG. 4;

FIG. 6 is a view taken along line 6—6 of FIG. 4;

FIG. 7 is a plan view of the lowermost horizontal brace configuration of the tower;

FIG. 8 is a section taken along line 8—8 of FIG. 1 showing the compression of the bifurcations of a crossmember end preparatory to insertion into the column channel;

FIG. 9 is an isometric view of the blocking clip used in the joints to prevent joint separation;

FIG. 10 is a top plan view of the floor layout of a tower side in assembly, ready to bring the columns together with the accompanying scissoring the cruciform crossmembers as they seat;

FIG. 11a is an end view diagrammatic illustration of a lone assembled side of the tower;

FIG. 11b illustrates two assembled sides erected for assembly of the remaining two sides;

FIG. 11c illustrates the final assembly of the remaining two sides to the first two sides;

FIG. 12 is a fragmentary detail of a column section showing the pre-cut window for the crossmembers;

FIG. 13 is a section taken longitudinally centrally of a column channel illustrating the three converging crossmembers in place;

FIG. 14 is a fragmentary elevational view of the end of a diagonal crossmember;

FIG. 15 illustrates a crossmember-to-crossmember joint in which the thick walls of the butted crossmember meet the thin walls of the receiving crossmember;

FIG. 16 is a section taken along line 16—16 of FIG. 15;

FIG. 17 is a section taken along line 17—17 of FIG. 15;

FIG. 18 is a section taken along 18—18 of FIG. 15;

FIG. 19 is a sectional view of a section type of crossmember-to-crossmember joint wherein the butted members thick walls align with the thick walls of the receiving crossmembers;

FIG. 19a is a section taken along 19a—19a of FIG. 19.

FIG. 20 is an elevational view of the anchoring structure for securing the lower ends of the tower to a supposing slab;

FIG. 21 is a section taken along line 21—21 of FIG. 20.

DETAILED DESCRIPTION OF THE PREFERRED EMBODIMENT

Figure 22:
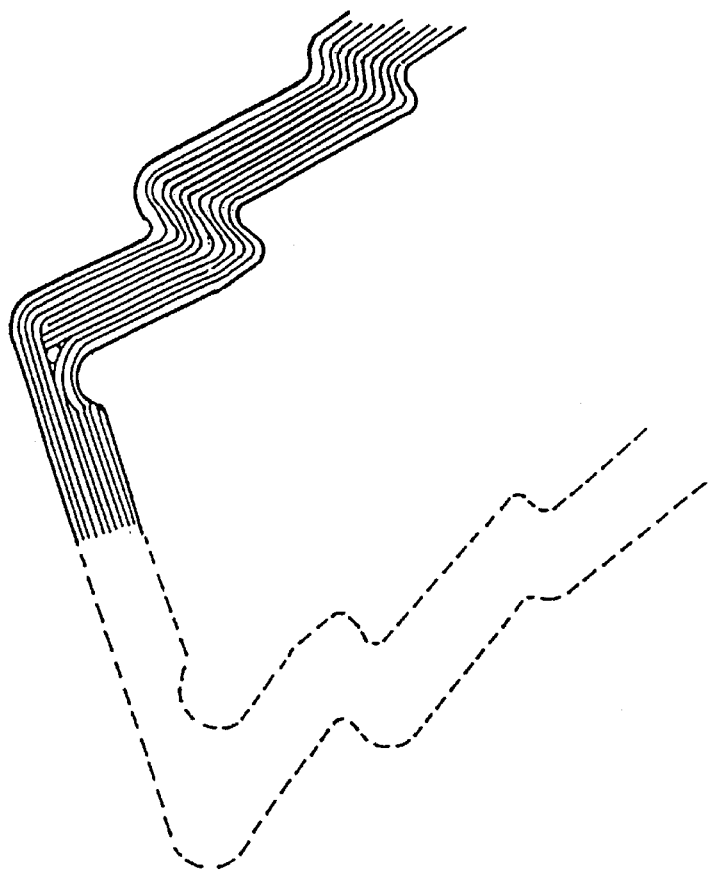
FIG. 22 is a lateral section taken through a column illustrating the overlapping fiber cloth construction; and, FIG. 23 is a plan view of a sample of the bidirectional fiber cloth used in the construction of the column of FIG. 22.
Figure 23:
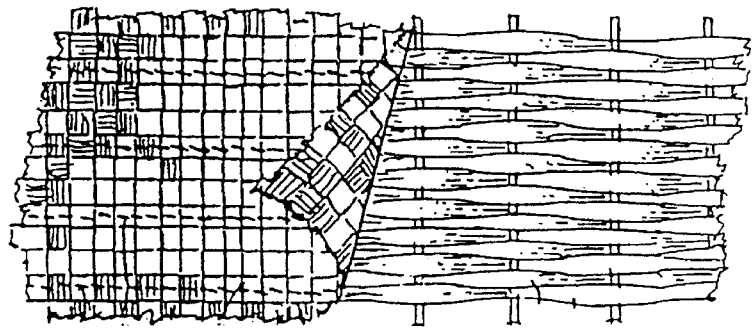

The example of the construction of the invention which is described herein is the high voltage transmission tower 10 shown in full in FIG. 1. The tower is dependant for support on its four columnar legs 12 which are in turn supported by crossmembers 14 which, in the upper half of the tower take the form of consecutive cruciform member pairs 16 separated above and below by horizontal crossmembers 18. All of the crossmembers are exactly the same in cross section, being pultruded from the same die to produce a continuous, or endless, "length", which is cut to the length of the required brace and subsequently machined into final form. Likewise the columns have uniform cross sections and are identical from one to the next, all being pultruded from the same die, so that two and only two pultrusionsns are required for the entire tower. This is considered close to an ideal configuration although there is latitude for use of a third smaller crossmember in the lower tower half where the crossmembers are used as redundant bracing. The crossmember cross section perimeter of the prototype tower is square, 2 inches on a side, and hollow as shown in FIG. 3 having thick and thin side walls 20 and 22 respectively, being one half inch and one quarter inch thick.

The columns 12 are of a much more complex configuration than the crossmembers. The column cross section is best seen in FIG. 8 wherein it can be seen that it has a central web 24 and defines chambers 26 on the opposite sides of the web. Each chamber is pultruded in completely enclosed form having side walls composed of overlapping layers of fiber cloth which extend continuously around the walls of the chambers and the web to define an integral unit with no seams or lines of weakness. The outer sidewalls of the chambers, opposite the web, are of equal thickness and strength as the sidewalls but are described as a "skin" herein inasmuch as the skin 30 is apertured to define the windows 32 shown in FIG. 12 to permit insertion of crossmembers into the two plane-defining channels 34 formed by the chambers 26. The channels extend at right angles to one another inasmuch as this particular tower is quadrilateral in planform, but the planform could be based on any other polygon.

The interior channel walls 36 are convoluted or undulated to form ridges or teeth 38 which engage the corresponding configuration of the locking side walls 40 of the ends of the crossmembers 14. The crossmembers are bifurcated by a deep re-entrant slot 42 which is cut parallel to the thick walls of the crossmembers so that the bifurcations 44 are formed in the ends of the thick walls. The ends of the locking side walls are contoured to fit the abutting structure 46 of the web and channel at whatever angle is needed to seat properly considering the particular angle of entry of the crossmember in its custom-cut window.

Assembly of all crossmember-to-column joints is effected by compressing the two bifurcations of the crossmember as indicated diagrammatically in FIG. 8, decreasing the combined dimensions of the bifurcations until they fit into the window. This can be done with any clamp, although specially designed clamps make the job easier.

Once inside the channel, the clamp is released and the bifurcations are permitted to expand into locking engagement with the detente side walls 36 as shown in FIG. 8. A secure joint is formed, although it is at this point subject to potential weakness from a deflective force which would tend to compress the bifurcations and is also vulnerable to vandals. These problems are overcome with the U-shaped clip 48 shown in FIG. 9, used to positively lock the bifurcations against subsequent compression once locked. The clip 48 is preferably a transverse section cut from a continuous pultruded channel. It is inserted into the hollow void of the crossmember and pushed far enough in to avoid the bifurcation slot and permit the compressed tines to be installed into the channel. Subsequently the clip is slid down to the end of the crossmember so that the shoulders 50 at the ends of the U-legs 52 snap into the bifurcation cutouts 54 shown in FIG. 8. The U-legs 52 are generally planar and are perpendicularly oriented relative to the V-shaped bifurcation cut 42 so that the full stiffness of the composite construction opposes compression of the crossmember bifurcations. Once snapped into final position the clips can only be removed with a special tool.

In order to assemble the tower without having to make windows 32 oversized, or cut a single window for all three crossmembers with interfitting cover plates as shown in one of the parent patents, the crossmembers must slip into place axially rather than being rotated into place with a pivotal motion. To do this with the cruciform pairs 16, the sides are formed by laying out all of the crossmembers that extend between the channels as shown in FIG. 10, and then moving the columns together while simultaneously inserting the ends of all crossmembers into their respective windows. Because the cruciform pairs are jointed centrally, this assembly technique requires that there be adequate play to scissor the crossmember slightly as shown in FIG. 10. To this end the joint between the two members of the cruciform pair is configured to allow this deflection, up to about 18 degrees which is adequate for completion of the installation.

The joint between the two crossed members is unusual and relies upon the flexibility and resilience of the composite material of which the crossmembers are made. The first crossmember 55 of the pair is provided with a longitudinally extended slit 56 terminating in circular punch-outs 58. The slit is provided with a central internal notch 60.

The second crossmember 64 is externally notched at 62 as shown in FIG. 5, reducing the overall thickness of the second crossmember at the notches to about an inch and half. While the first crossmember is expanded at the slit, the second crossmember is inserted into the expanded opening until the respective notches align. When the sides of the first crossmember straddling the slit are released, the notches seat and a snug joint is formed which, by virtue of the 18 degree rocker-style angulated wall 66 of the exterrnal notch 62 shown in FIG. 4, allows scissoring of the members and assembly as shown shown in FIG. 10.

Because the slit 56 severs only a few longitudinally extended fibers, strength reduction due to the slit in the crossmember is minimal. At the same time the substantially flexibility of the hard composite crossmember is utilized, enabling expansion of the slit of more than half an inch over a slit length of only nineteen inches. It is remarkable that this works.

The horizontal crossmembers 18 of course do not need to be scissored to be installed since they are substantially orthogonally extended and are not connected to other crossmembers. The horizontal and cruciform crossmembers comprise the support structure for the upper half of the tower. The entire upper half of the tower is thus fabricated from two pultrusions with a single joint configuration. No fasteners or adhesives are used. The conductor suspension structure 68 and the goat peak 70 will be added later. They can be implemented in many ways which do not contribute to the novelty of the invention as claimed and are not described.

The upper half of the tower is spliced to the lower half at 72. Joining mandrels 74 are inserted between the two halves to overlap the splice line and pegged into place through bores cut in the respective members as shown in FIG. 2a. The columns and crossmembers are similarly spliced. In the splice section the diagonal crossmembers must each be made in two pieces so that they can be swung into alignment and the joining mandrells engaged in splice-line-overlapping mode, where they may be pegged in place or retained by friction or adhesive.

The top half of the tower need not necessarily be spliced onto a composite lower half. There are a number of situations in which it would be desirable to use a steel base with only the top being composite. This configuration would have substantially all of the advantages of the full composite construction with only half the composite material of a full composite tower. In locations in which heavy impacts may be experienced by the lower portion of the tower, steel would probably be better. Also, if the top of a tower is damaged, or if existing towers are being modified to gain the EMF advantages of the composite material, the existing lower steel section can be retained. The connection between the top of the existing steel tower portion, and the upper composite, new portion of the tower would be substantially identical to the connection of the lower half of the full composite tower to the underlying anchors or stubs wherein steel angles are coupled to the bottoms of the columns with specially designed couplings.

The lower half of the tower differs from the upper in that the bracing is not the cruciform/horizontal alternating configuration. As the tower gets wider, redundant bracing is needed to prevent buckling of the horizontal members. The same crossmembers are used, but the joints are slightly different as now joints are needed for crossmembers butted into the sides of other crossmembers. These joints are similar in concept to the crossmember-two-column joint, and are provided in two variation, depending on whether the meeting of the butt member and receiving member are with the thick walls aligned, or aligned thick-wall to thin-wall. Thick-to-thin is shown in FIGS. 15 through 18. It can be seen in FIG. 18 that the thick walls of the butted crossmember 74 line up with the thin walls of the receiving member 76. The receiving member has a window 78 cut into it as shown in FIG. 17. The window is narrow enough to leave shoulders 80 in the thick side wall. The configuration of the bifurcations 82 for this type of joint provides opposed notches 84 which snap into engagement over the shoulders as shown in FIG. 18. Just as in the column joint, the clip 48 is used, snapping into cutaways 54 for final locking.

A similar joint is shown in FIG. 19 for the thick- to-thick-wall-aligned interface. In the FIG. 19 configuration the window 88 of the receiving member is cut fully to the inner surfaces of the thick side walls and beyond into the side walls themselves, reducing the wall thickness at that point by about ⅓. In order to provide the shoulder which enables positive coupling, the receiving member is milled from the rear to define slotted cutaways 90 which extend approximately half of the thickness of the crossmember and then stop, defining shoulders 91 at their termination as shown in the drawings.

The thick side walls which form the bifurcations of the butted crossmember in this configuration are notched at 92 so that the bifurcations lock around the shoulders similarly to the locking of the FIG. 18 joint. Again the clip 48 finishes the joint in the same manner as previously described.

The crossmember-to-crossmember joints may be of either type, depending on the orientation of the meeting members.

These joints are noticeably less strong than the crossmember-to-column joint, which must take stress and strain not required of the small joints. The joints may occur between members at any angle, most of which are not 90 degrees. Each joint is configured by the computer driven CNC machine so odd angles in an orthogonal world do not add to production cost. The machine can make the joints at any angle with equal ease.

In addition to the illustrated redundant bracing of the bottom half of the tower there are diaphram braces which extend diagonally between adjacent members which radiate from each column. These are shown in FIG. 7 connecting the outer frame crossmembers, and are similarly extended between crossmembers which meet at the same column at points indicated in FIG. 1 at 94. Similar diaphram bracing is used extensively throughout the entire lower half of the tower.

The bottoms of the columns are mounted to underlying base slabs 94 by means of angle irons 96 which are identical to those used for steel towers. Inner and outer clamp assemblies 98 and 100 secure the angle irons to the bottom of the respective column with the diagonal crossmembers being bolted to the angle as shown at 102 of FIG. 20.

As suggested above, substitution of the tops of the steel legs of a truncated steel tower for the concretre-mounted angle irons shown in FIG. 20 would result in a composite half tower mounted atop a truncated steel tower. In addition to its physical advantages in certain application this configuration may prove the easier to introduce to a market that has known nothing but steel since its inception.

Although each detail of the tower by itself may suggest construction techniques used in specific specialties in the engineering field, the overall impact of the power taken en toto is impressive. This is a full-size, full-capability 85 foot tower made of substantially nothing but two pultruded forms and no fasteners. Its sky-gray (it could be any color, the color being in the resin matrix rather than a surface coating so that it never wares) reduces its visibility in open country and presents a profile that is more attractive by almost any yardstick than traditional steel towers. It has no natural enemies and barring a cataclysmic accident such a tower would last indefinitely. Pultruded composites which have been exposed to the elements for thirty years show no signs of weakening. The illustrated tower is likely only the beginning of an infinite variety of structures that can be formed with the same techniques and concepts. The advent of CAD and CAM programming and C & C machines remove a technology which could have been labor intensive to the point of being economically non feasible twenty years ago. A final production facility will have in alignment first a pultrusion machine followed by a chopper to test the pultrusion into appropriate lengths and finally a CNC-type computer controlled device to create the windows and crossmember terminations so that in essence the operator will have no more to do than monitor the equipment while the members are produced at two feet per minute from raw glass, fiber and resin.

We claim:

1. Composite construction wherein a structure derives substantially all its structural strength and integrity from pultruded structural members interconnected at substantially fastener-free joints, comprising:

(a) columns of substantially identical cross-section throughout their lengths and each defining a pair of deeply re-entrant longitudinally extended substantially plane-defining channels each having detent sidewalls configured to present a detent structure for mating crossmember ends inserted therein along the column length;

(b) a plurality of pultruded column-supporting crossmembers having ends with opposed locking sidewalls which are compressible together to permit insertion of said ends into said channels, said locking sidewalls being configured to matingly engage the detent sidewalls of said channels when inserted therein and permitted to resiliently expand in locked relation therewith;

(c) said columns being formed with a continuous peripheral skin covering both of said channels and having a discrete crossmember-receiving window in said skin for each crossmember to be received in the respective channel, said windows being dimensioned and configured to substantially flushly fit the perimeter of the crossmember to be inserted therein;

(d) said construction substantially defining a polygon in horizontal cross-section with one of said columns at each corner of said polygon to define upright legs of said construction; and, (e) a plurality of said column-supporting crossmembers each spanning between two of said upright legs and the ends of said crossmembers are configured to matingly engage in the channel of the respective leg and substantially completely fill the respective window in the respective leg through which the respective crossmember passes.

2. A construction according to claim 1 wherein a plurality of said crossmembers are essentially monolithic and configured as cruciform pairs which cross generally centrally of one another with a first crossmember of each pair having a generally central insertion opening and the other member of each pair being a second crossmember which is slid axially into said insertion opening until configured a cruciform joint.

3. A construction according to claim 2 wherein said central insertion opening is an elongated longitudinally extended slit.

4. A construction according to claim 3 wherein said slit is an island void within said first crossmember such that same has an unbreached periphery and is adequately resilient to be expandable on the opposite sides of said slit to permit expansion of said slit to permit passage of said second member of the respective pair therethrough.

5. A construction according to claim 4 wherein said slit is centrally notched internally of said first crossmember defining an internal notch of width inadequate to pass the full width of said second crossmember therethrough when said first crossmember is not expanded along said slit.

6. A construction of claim 5 wherein said second crossmember defines an external notch to mate with said first crossmember, said notches being dimensioned to form an interlocked notch pair when said first crossmember is completely relaxed along said slit.

7. A Constriction according to claim 6 wherein said notches are cut such that the crossmembers of the respective crossmember pair define a scissoring plane and are deflectable within limits within said scissoring plane when said notch pair is seated to permit scissoring of said crossmembers of said crossmember pairs during installation to facilitate the seating of the ends thereof in the respective legs.

8. A construction according to claim 7 wherein said notches are configured to limit said scissoring of said crossmember pairs to on the order of 18°.

9. A construction according to claim 8 wherein said slit and the cross-section of said crossmembers have a substantially proportionate relationship such that when said crossmembers are square in cross section with sides on the order of two inches, said slits are on the order of 18 inches long and said internal notch is on the order of one and one-quarter inches wide when said slit is not expanded, such that expansion of said first crossmember of on the order of three quarters of an inch enables insertion of said second crossmember through said internal notch.

10. A construction according to claim 1 wherein the cross section of said columns defines a central web and two chambers extending from opposite sides of said web such that said chambers define said channels, and the portions of said chambers remote from said web define said skin, and said chambers are defined with reinforcing crossmember stop structure adjacent said web and said chambers having walls such that said walls and skin and web are of substantially the same thickness and defined by a multiplicity of layers of fiber cloth at least some of which display bidirectional fiber orientation, and at least some of which wrap around substantial portions of said chambers and overlap one another to define said chamber walls, said web and said skin as a thoroughly integral unit without significant weak areas by design.

11. A construction according to claim 1 wherein said crossmembers are hollow and the ends thereof are each bifurcated by a longitudinal bifurcation-defining slot entrant from the respective end of the crossmember to define two bifurcations and including a generally U-shaped clip having U-legs and being dimensioned to insert into the hollow interior of a crossmember, with the U-legs of said clip substantially parallel to each other and to the direction of compressing movement of said bifurcations such that said clip can be moved back into said hollow interior clear of said slot to permit compression of said bifurcations and seating of the respective crossmember end, and then relocated to a position between said bifurcations to positively block same (against compression.

12. A construction according to claim 11 wherein said clip is a spring clip such that said U-legs are deflectable toward and away from one another and including catch means on said U-legs to engage mating structure on said bifurcations to positively lock said clips in place once the respective crossmember end has seated.

13. A construction according to claim 12 wherein said mating structure comprises clip notches defined by the ends of said bifurcations and said catch means comprises raised flanges on the outer edges of said U-legs to engage said clip notches.

14. Structure according to claim 13 wherein said clip is one of a plurality of clips useable in both column-to-crossmember joints and crossmember-to-crossmember joints and all have uniform longitudinal cross sections because all are transverse sections cut from a pultruded composite channel member.

15. A construction according to claim 1 wherein some of said crossmembers are hollow redundant members defining redundant bracing using crossmember-to-crossmember butt joints wherein a receiving crossmember is cut through on one side to define a joint window to the hollow interior thereof and a butted crossmember has a butt end configured to compress for insertion into said joint window and expand inside said hollow interior defining projections which lock into place against the sidewalls of said receiving crossmember.

16. A construction according to claim 15 wherein said butt end is bifurcated into resilient tines to permit compression thereof and including a resilient U-shaped clip having U-legs, said U-shaped clip being inserted into the hollow interior of said butted crossmember with the U-legs thereof parallel to the direction of compression of said tines to prevent the compression thereof once seated.

17. A construction according to claim 16 wherein said clip has catch means engageable with mating structure in said butted crossmember end to positively lock said clip in position in the end of the respective crossmember blocking the compression of said tines.

18. A construction according to claim 1 wherein said construction is a tower and including a base comprising a truncated steel tower coupled to the lower ends of said columns.

19. A construction according to claim 1 and including a mounting base having protruding upright angle irons of the type used to anchor steel towers and which emulate the corner angle legs of a steel column, and further including adaptive couplings for connecting said angle irons to the lower ends of said columns whereby said construction can be alternatively mounted on said base or on the corner angle legs of a truncated steel tower to define the top portion of the tower.

* * * * *